United States Patent
Lu et al.

(10) Patent No.: US 11,961,658 B2
(45) Date of Patent: Apr. 16, 2024

(54) THREE-PHASE INDUCTOR AND POWER MODULE

(71) Applicant: Delta Electronics (Shanghai) CO., LTD, Shanghai (CN)

(72) Inventors: Zengyi Lu, Shanghai (CN); Tianding Hong, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 91 days.

(21) Appl. No.: 17/228,677

(22) Filed: Apr. 12, 2021

(65) Prior Publication Data

US 2021/0366650 A1 Nov. 25, 2021

(30) Foreign Application Priority Data

May 25, 2020 (CN) .......................... 202010447154.0

(51) Int. Cl.
*H01F 27/26* (2006.01)
*H01F 30/12* (2006.01)

(52) U.S. Cl.
CPC ............. *H01F 30/12* (2013.01); *H01F 27/26* (2013.01)

(58) Field of Classification Search
CPC .......... H01F 30/12; H01F 27/26; H01F 37/00; H01F 3/10; H01F 17/045; H01F 27/266; H01F 27/306; H02M 1/44; H02M 1/0064; H02M 1/4225; H02M 3/003; H02M 3/1586; H02M 7/003; H02M 7/219; H02M 1/4216; H02M 1/4233; Y02B 70/10

See application file for complete search history.

(56) References Cited

U.S. PATENT DOCUMENTS

| | | |
|---|---|---|
| 10,186,974 B2 | 1/2019 | Yang et al. |
| 2014/0340940 A1 | 11/2014 | Ouyang |
| 2017/0330678 A1 | 11/2017 | Harrison |
| 2017/0345541 A1 | 11/2017 | Yang et al. |
| 2018/0108472 A1 | 4/2018 | Pagenkopf |

(Continued)

FOREIGN PATENT DOCUMENTS

| | | | | |
|---|---|---|---|---|
| CN | 102891001 A | * | 1/2013 | .......... H01F 27/263 |
| CN | 105305856 A | * | 2/2016 | |

(Continued)

OTHER PUBLICATIONS

The 1st Office Action dated Dec. 10, 2020 by the CNIPA from application No. 202010447188.X.

(Continued)

*Primary Examiner* — Tuyen T Nguyen
(74) *Attorney, Agent, or Firm* — Qinghong Xu

(57) ABSTRACT

The present disclosure provides a three-phase inductor and a power module. A current flowing through each inductor of the three-phase inductor comprises a power-frequency current component and a high-frequency current component. The three-phase inductor includes a magnetic core and a winding. The magnetic core includes a first cover plate, a second cover plate and a magnetic pillar unit; the winding wound on the first magnetic pillar and the second magnetic pillar of the corresponding magnetic pillar unit, and a current flowing through the winding surrounds said first magnetic pillar and said second magnetic pillar in an opposite direction.

8 Claims, 9 Drawing Sheets

(56) References Cited

U.S. PATENT DOCUMENTS

| | | |
|---|---|---|
| 2021/0366650 A1 | 11/2021 | Lu et al. |
| 2022/0084734 A1 | 3/2022 | Lai et al. |
| 2022/0208425 A1 | 6/2022 | Lu et al. |
| 2023/0009358 A1 | 1/2023 | Li et al. |

FOREIGN PATENT DOCUMENTS

| | | | |
|---|---|---|---|
| CN | 106057433 A | * | 10/2016 |
| CN | 106057433 A | | 10/2016 |
| CN | 206211537 U | | 5/2017 |
| CN | 106998142 A | | 8/2017 |
| CN | 106057433 B | | 3/2018 |
| CN | 108648899 A | | 10/2018 |
| CN | 108777220 A | | 11/2018 |
| CN | 109390118 A | | 2/2019 |
| CN | 107077951 B | | 5/2019 |
| KR | 101828831 B1 | | 2/2018 |
| WO | 2009059069 A2 | | 5/2009 |
| WO | WO-2015066997 A1 | * | 5/2015 ............ H01F 27/24 |

OTHER PUBLICATIONS

The 1st Office Action dated Aug. 13, 2021 for CN patent application No. 202010447154.0.

The 2nd Office Action dated Jun. 3, 2021 for CN patent application No. 202010447188.X.

Notice of Allowance dated Jan. 31, 2023 of U.S. Appl. No. 17/215,010.

\* cited by examiner

THREE-PHASE INDUCTOR AND POWER MODULE

CROSS-REFERENCE TO RELATED APPLICATIONS

This application is based upon and claims priority to Chinese Patent Application No. 202010447154.0, filed on May 25, 2020, the entire content of which is herein incorporated by reference for all purpose.

TECHNICAL FIELD

The invention relates to the field of power electronics technology, and in particular, to a three-phase inductor and a power module.

BACKGROUND

At this stage, in power modules with high power density, the volume, weight, and loss of inductors account for a large proportion, so the status of inductors becomes more and more important.

Especially in power modules that include multiple inductors, multiple inductors are often set independently, which results in a larger overall inductor and makes it difficult to apply to power modules with higher integration.

SUMMARY

According to a first aspect of the present invention, a three-phase inductor is provided. A current flowing through each inductor includes a power-frequency current component and a high-frequency current component, and the three-phase inductor includes:

a magnetic core comprising a first cover plate, a second cover plate and at least one magnetic pillar unit, the first cover plate and the second cover plate disposed opposite to each other, the magnetic pillar unit sandwiched between the first cover plate and the second cover plate, and the at least one magnetic pillar unit comprising a first magnetic pillar unit, a second magnetic pillar unit, and a third magnetic pillar unit, each of the magnetic pillar units comprising a first magnetic pillar and a second magnetic pillar; and at least one winding comprising a first winding, a second winding, and a third winding;

the first winding being wound on the first magnetic pillar and the second magnetic pillar of the first magnetic pillar unit, and a first current flowing through the first winding surrounds the first magnetic pillar and the second magnetic pillar of the first magnetic pillar unit in an opposite direction;

the second winding being wound on the first magnetic pillar and the second magnetic pillar of the second magnetic pillar unit, and a second current flowing through the second winding surrounds the first magnetic pillar and the second magnetic pillar of the second magnetic pillar unit in an opposite direction;

the third winding being wound on the first magnetic pillar and the second magnetic pillar of the third magnetic pillar unit, and a third current flowing through the third winding surrounds the first magnetic pillar and the second magnetic pillar of the third magnetic pillar unit in an opposite direction.

In some embodiments of the present disclosure, the first magnetic pillar unit, the second magnetic pillar unit, and the third magnetic pillar unit being sequentially spaced apart with each other along a first direction, and in each of the magnetic pillar units, the first magnetic pillar and the second magnetic pillar being disposed at an interval along a second direction, and an angle between the first direction and the second direction is between 60° and 120°;

two ends of the first magnetic pillar being respectively connected to the first cover plate and the second cover plate, and two ends of the second magnetic pillar being respectively connected to the first cover plate and the second cover plate.

In some embodiments of the present disclosure, the first cover plate and the second cover plate being both integrated plate-shaped structures, and the first cover plate and the second cover plate being arranged in parallel, and the first magnetic pillar and the second magnetic pillar being both perpendicular to the first cover plate and the second cover plate.

In some embodiments of the present disclosure, the power-frequency current component of the first current, the power-frequency current component of the second current, and the power-frequency current component of the third current have a phase difference of 120°, respectively.

In some embodiments of the present disclosure, a direction in which the first current surrounds the first magnetic pillar of the first magnetic pillar unit is the same as a direction in which the third current surrounds the first magnetic pillar of the third magnetic pillar unit, and the direction in which the first current surrounds the first magnetic pillar of the first magnetic pillar unit is the same as or opposite to a direction in which the second current surrounds the first magnetic pillar of the second magnetic pillar unit.

In some embodiments of the present disclosure, the power-frequency current component of the first current, the power-frequency current component of the second current, and the power-frequency current component of the third current have a same phase, and the high-frequency current component of the first current, the high-frequency current component of the second current and the high-frequency current component of the third current have a phase difference of 120°, respectively.

In some embodiments of the present disclosure, a direction in which the first current surrounds the first magnetic pillar of the first magnetic pillar unit is the same as a direction in which the third current surrounds the first magnetic pillar of the third magnetic pillar unit, and the direction in which the first current surrounds the first magnetic pillar of the first magnetic pillar unit is the same as or opposite to a direction in which the second current surrounds the first magnetic pillar of the second magnetic pillar unit.

In some embodiments of the present disclosure, a frequency of the power-frequency current component is within 120 Hz, and a frequency of the high-frequency current component is at least 20 kHz.

According to a second aspect of the present invention, a power module is provided, which includes the three-phase inductor mentioned above, the power module is a three-phase power factor correction (PFC) circuit module, the first winding, the second winding and the third winding are respectively used to form a first inductor, a second inductor and a third inductor in the three-phase PFC circuit module;

the power-frequency current component of the first current, the power-frequency current component of the second current, and the power-frequency current component of the third current have a phase difference of 120°, respectively.

In some embodiments of the present disclosure, a direction in which the first current surrounds the first magnetic pillar of the first magnetic pillar unit is the same as a direction in which the third current surrounds the first magnetic pillar of the third magnetic pillar unit, and the direction in which the first current surrounds the first magnetic pillar of the first magnetic pillar unit is the same as or opposite to a direction in which the second current surrounds the first magnetic pillar of the second magnetic pillar unit.

In some embodiments of the present disclosure, the three-phase PFC circuit module includes: a first input terminal, a second input terminal, and a third input terminal for electrically connecting a three-phase alternating current power source; a positive output terminal and a negative output terminal electrically connected to a load; and a first switch bridge arm, a second switch bridge arm, and a third switch bridge arm connected in parallel between the positive output terminal and the negative output terminal;

the first input terminal being electrically connected to a neutral point of the first switch bridge arm through the first inductor, the second input terminal being electrically connected to neutral point of the second switch bridge arm through the second inductor, and the third input terminal being electrically connected to neutral point of the third switch bridge arm through the third inductor.

According to a third aspect of the present invention, a power module is provided, which includes the three-phase inductor mentioned above. The power module is a three-way interleaved single-phase PFC circuit module, and the first winding, the second winding and the third winding being respectively used to form a first inductor, a second inductor and a third inductor in the three-way interleaved single-phase PFC circuit module;

the power-frequency current component of the first current, the power-frequency current component of the second current, and the power-frequency current component of the third current have a same phase, and the high-frequency current component of the first current, the high-frequency current component of the second current and the high-frequency current component of the third current have a phase difference of 120°, respectively.

In some embodiments of the present disclosure, a direction in which the first current surrounds the first magnetic pillar of the first magnetic pillar unit is the same as a direction in which the third current surrounds the first magnetic pillar of the third magnetic pillar unit, and the direction in which the first current surrounds the first magnetic pillar of the first magnetic pillar unit is the same as or opposite to a direction in which the second current surrounds the first magnetic pillar of the second magnetic pillar unit.

In some embodiments of the present disclosure, the three-way interleaved single-phase PFC circuit module includes an input terminal for electrically connected a single-phase alternating current power source, a rectifier bridge electrically connected to the input terminal, a positive output terminal and a negative output terminal for electrically connected a load, and a first switch bridge arm, a second switch bridge arm, and a third switch bridge arm connected in parallel between the positive output terminal and the negative output terminal;

the rectifier bridge being electrically connected to a neutral point of the first switch bridge arm through the first inductor, the rectifier bridge being electrically connected to a neutral point of the second switch bridge arm through the second inductor, and the rectifier bridge being electrically connected a neutral point of the third switch bridge arm through the third inductor.

BRIEF DESCRIPTION OF THE DRAWINGS

By considering the following detailed description of the preferred embodiments of the present disclosure in conjunction with the accompanying drawings, various objectives, features, and advantages of the present disclosure will become more apparent. The drawings are merely exemplary illustrations of the present disclosure and are not necessarily drawn to scale. In the drawings, the same reference numerals always indicate the same or similar parts, in which.

REFERENCE NUMERALS

Figure 1:
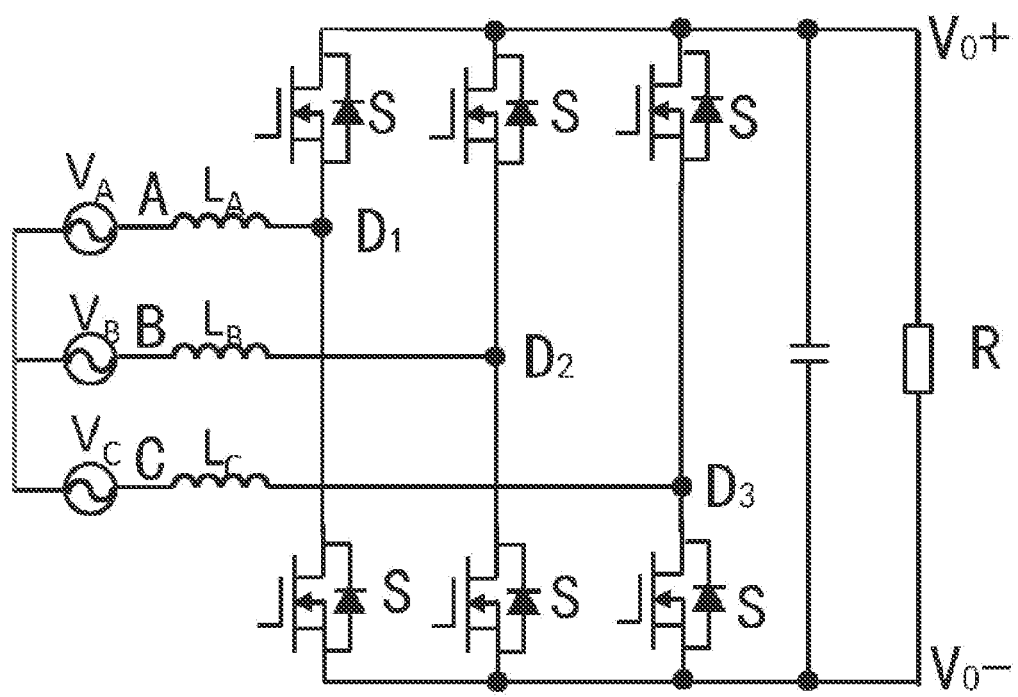
FIG. 1 is a schematic diagram of a three-phase PFC circuit module according to some embodiments.

| 10 | First Cover Plate; | 20 | Second Cover Plate; |
|---|---|---|---|
| 30 | Magnetic Pillar Unit; | 31 | First Magnetic Pillar Unit; |
| 311 | First Magnetic Pillar; | 312 | Second Magnetic pillar; |
| 32 | Second Magnetic Pillar Unit; | 321 | First Magnetic Pillar; |
| 322 | Second Magnetic Pillar; | 33 | Third Magnetic Pillar Unit; |
| 331 | First Magnetic Pillar; | 332 | Second Magnetic Pillar; |
| 40 | Winding; | 41 | First Winding; |
| 42 | Second Winding; | 43 | Third Winding. |

DETAILED DESCRIPTION

Typical embodiments embodying features and advantages of the present disclosure will be described in detail in the following description. It should be understood that the present disclosure can have various changes in different embodiments, which do not depart from the scope of the present disclosure, and the description and drawings herein are essentially for illustrative purposes, rather than limiting the present disclosure.

In the following description of the different exemplary embodiments of the present disclosure, reference is made to the accompanying drawings, which form a part of the present disclosure, and show, by way of example, different exemplary structures, systems, and steps that can implement various aspects of the present disclosure. It should be understood that other specific schemes of components, structures, exemplary devices, systems, and steps can be used, and structural and functional modifications can be made without departing from the scope of the present disclosure. Moreover, although the terms "above", "between", "within", etc. may be used in this specification to describe different exemplary features and elements of the present disclosure, these terms are used herein for convenience only, such as directions of the examples in the drawings. Nothing in this specification should be understood as requiring a specific three-dimensional direction of the structure in order to fall within the scope of the present disclosure.

FIG. 1 to FIG. 9 provide a three-phase inductor and a power module including the three-phase inductor according to some embodiments of the present disclosure. The current flowing through each inductor of the three-phase inductor includes a power-frequency current component and a high-frequency current component. The three-phase inductor includes a magnetic core and a winding 40. The magnetic core includes a first cover plate 10, a second cover plate 20, and a magnetic pillar unit 30. The first cover plate 10 and the second cover plate 20 are disposed opposite to each other. The magnetic pillar unit 30 is sandwiched between the first cover plate 10 and the second cover plate 20. The magnetic pillar unit 30 includes a first magnetic pillar unit 31, a second magnetic pillar unit 32, and a third magnetic pillar unit 33. Each magnetic pillar unit 30 includes a first magnetic pillar and a second magnetic pillar. For example, the magnetic pillar unit 31 includes a first magnetic pillar 311 and a second magnetic pillar 312, the second magnetic pillar unit 32 includes a first magnetic pillar 321 and a second magnetic pillar 322, and the third magnetic pillar unit 33 includes a first magnetic pillar 331 and a second magnetic pillar 332. The winding 40 is wound on the first magnetic pillar and the second magnetic pillar of each magnetic pillar unit 30. In each magnetic pillar unit 30, the direction in which the current flowing through the winding 40 wounded on the first magnetic pillar surrounds the first magnetic pillar is opposite to the direction in which the current flowing through the winding 40 wounded on the second magnetic pillar surrounds the second magnetic pillar. The current flowing through the winding 40 wound on the first magnetic pillar unit 31 generates a first magnetic flux $\Phi$ a, the current flowing through the winding 40 wound on the second magnetic pillar unit 32 generates a second magnetic flux $\Phi$ b, and the current flowing through the winding 40 wound on the third magnetic pillar unit 33 generates a third magnetic flux $\Phi$ c. The first magnetic flux $\Phi$ a, the second magnetic flux $\Phi$ b, and the third magnetic flux $\Phi$ c are superimposed on the first cover plate 10 to achieve the effect of reducing the magnetic flux.

In the three-phase inductor of these embodiments, the integration degree of the three-phase inductor is improved by sandwiching three magnetic pillar units 30 between the first cover plate 10 and the second cover plate 20. Furthermore, the loss of the magnetic core is reduced by at least partially counteracting the magnetic fluxes of the three windings 40 on the first cover plate 10, thereby further reducing the volume of the three-phase inductor. The frequency of the power-frequency current component mentioned in these embodiments is within 120 Hz, for example, a sinusoidal current of 50 Hz or 60 Hz, or a current of 100 Hz or 120 Hz after rectification. The frequency of the high-frequency current component mentioned in these embodiments is a switching frequency of a switching device, which is usually above 20 kHz.

Figure 3:
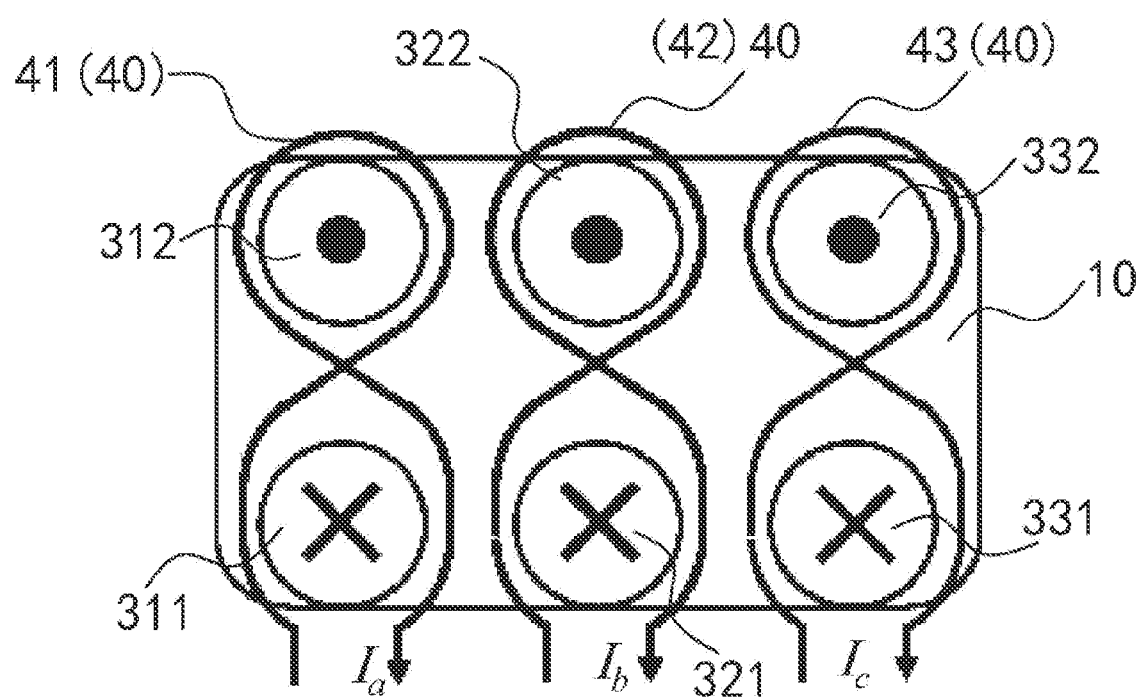
FIG. 3 is a partial structural diagram of a three-phase inductor according to some embodiments.

In some embodiments, as shown in FIG. 3, the winding 40 includes a first winding 41, a second winding 42 and a third winding 43. The first winding 41 is wound around the first magnetic pillar 311 and the second magnetic pillar 312 of the first magnetic pillar unit 31, and a first current $I_a$ flowing through the first winding 41 surrounds, in different directions, the first magnetic pillar 311 and the second magnetic pillar 312. The different directions refer to opposite directions, and 'the current surrounds, in opposite directions, the first magnetic pillar and the second magnetic pillar' mentioned herein means that if the direction of a current along the first magnetic pillar is a clockwise direction, then the direction the current along the second magnetic pillar is a counterclockwise direction; and vice versa. For example, the first current $I_a$ surrounds the first magnetic pillar 311 in a clockwise direction, and the first current $I_a$ surrounds the second magnetic pillar 312 in a counterclockwise direction. Furthermore, the first magnetic flux $\Phi$ a generated by the first current $I_a$ is flowed in a closed magnetic circuit formed by the first magnetic pillar 311, the first cover plate 10, the second magnetic pillar 312, and the second cover plate 20, thus reducing the leakage of the first magnetic flux $\Phi$ a. The second winding 42 is wound around the first magnetic pillar 321 and the second magnetic pillar 322 of the second magnetic pillar unit 32, and the second current $I_b$ flowing through the second winding 42 surrounds, in opposite directions, the first magnetic pillar 321 and the second magnetic pillar 322. For example, the second current $I_b$ surrounds the first magnetic pillar 321 in a clockwise direction, and the second current $I_b$ surrounds the second magnetic pillar 322 in a counterclockwise direction. Furthermore, the second magnetic flux $\Phi$ b generated by the second current $I_b$ is flowed in a closed magnetic circuit formed by the first magnetic pillar 321, the first cover plate 10, the second magnetic pillar 322, and the second cover plate 20, thus reducing the leakage of the second magnetic flux $\Phi$ b. The third winding 43 is wound around the first magnetic pillar 331 and the second magnetic pillar 332 of the third magnetic pillar unit 33, and the third current $I_c$ flowing through the third winding 43 surrounds, in the opposite directions, the first magnetic pillar 331 and the second magnetic pillar 332. For example, the third current $I_c$ surrounds the first magnetic pillar 331 in a clockwise direction, and the third current $I_c$ surrounds the second magnetic pillar 332 in a counterclockwise direction. Furthermore, the third magnetic flux $\Phi$ c generated by the third current $I_c$ is flowed in a closed magnetic circuit formed by the first magnetic pillar 331, the first cover plate 10, the second magnetic pillar 332, and the second cover plate 20, thus reducing the leakage of the third magnetic flux $\Phi$ c. The symbol 'X' shown in FIG. 3 and FIG. 8 indicates that the direction of the magnetic flux is perpendicular to a paper surface inward, and the symbol '●' shown in FIG. 3 and FIG. 8 indicates that the direction of the magnetic flux is perpendicular to the paper surface outward. In some embodiments, the first magnetic flux $\Phi$ a, the second magnetic flux $\Phi$ b and the third magnetic flux $\Phi$ c all flow along their respective closed magnetic circuits to prevent the magnetic flux from leaking to the air, which is beneficial to improve the anti-EMI (Electromagnetic Interference) Effect. The winding 40 can be a Printed Circuit Board (PCB) or a multi-stranded wire.

Figure 2:
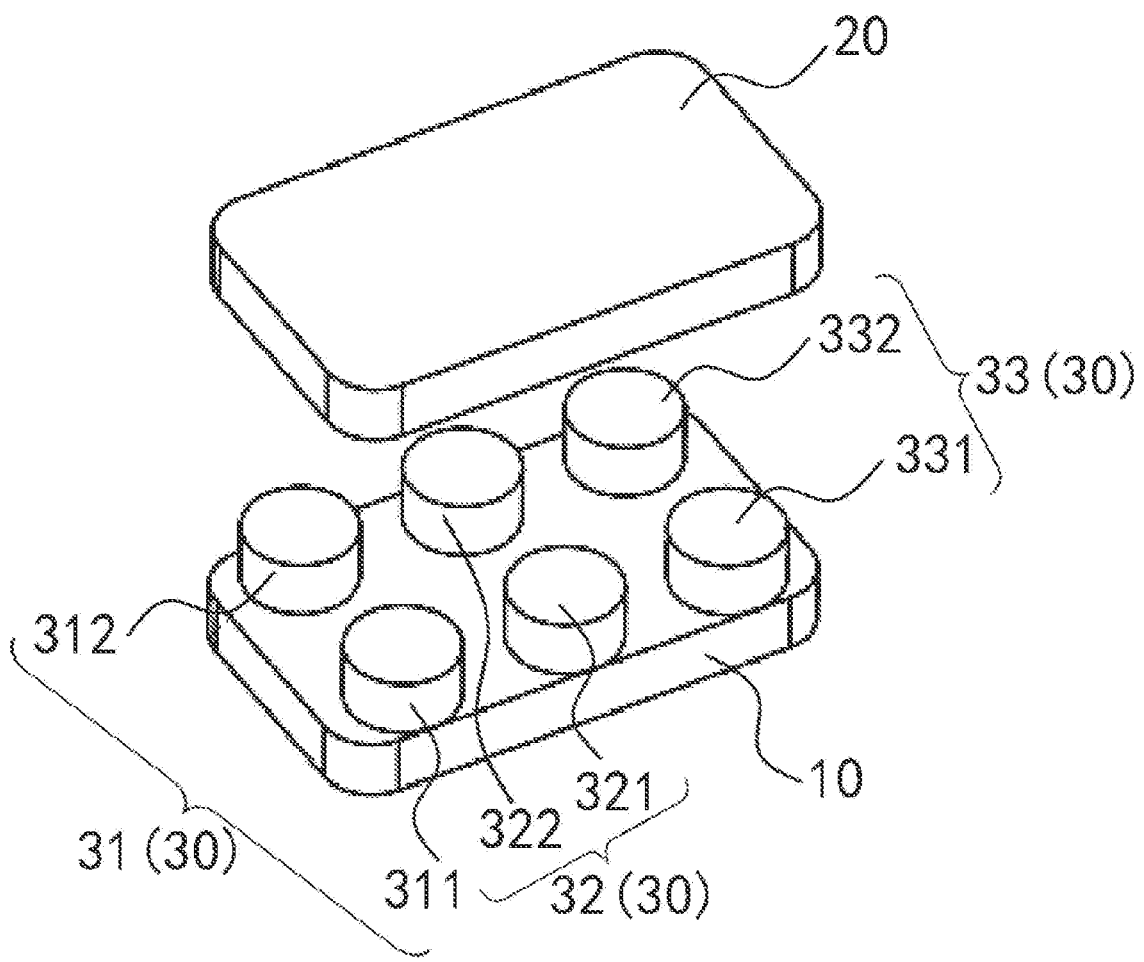
FIG. 2 is a schematic diagram showing an exploded structure of a magnetic core of a three-phase inductor according to some embodiments.

Referring to FIG. 1 to FIG. 4, in one embodiment as shown in FIG. 2, the first magnetic pillar unit 31, the second magnetic pillar unit 32, and the third magnetic pillar unit 33 are sequentially spaced apart along a first direction. Furthermore, in each magnetic pillar unit 30, the first magnetic pillar and the second magnetic pillar are disposed at an interval along a second direction, and an angle between the first direction and the second direction is between 60° and 120°, for example, the first direction is perpendicular to the second direction. For example, the first magnetic pillar 311 of the first magnetic pillar unit 31, the first magnetic pillar 321 of the second magnetic pillar unit 32, and the first magnetic pillar 331 of the third magnetic pillar unit 33 are spaced apart from each other in a lateral direction, and the second magnetic pillar 312 of the magnetic pillar unit 31, the second magnetic pillar 322 of the second magnetic pillar unit 32, and the second magnetic pillar 332 of the third magnetic pillar unit 33 are spaced apart from each other in the lateral direction. Furthermore, the first magnetic pillar 311 and the second magnetic pillar 312 of the first magnetic pillar unit 31 are spaced apart from each other in a longitudinal direction, the first magnetic pillar 321 and the second magnetic pillar 322 of the second magnetic pillar unit 32 are spaced apart from each other in the longitudinal direction, and the first magnetic pillar 331 and the second magnetic pillar 332 of the third magnetic pillar unit 33 are spaced apart from each other in the longitudinal direction. Two ends of the first magnetic pillar are respectively connected to the first cover plate 10 and the second cover plate 20, and two ends of the second magnetic pillar are respectively connected to the first cover plate 10 and the second cover plate 20, namely the first cover plate 10 and the second cover plate 20 are respectively arranged below and above the six magnetic pillars, so as to form closed magnetic circuits. In some embodiments, the magnetic core includes six magnetic pillars, and the six magnetic pillars are arranged in a 2×3 array, but the present disclosure is not limited to this. In other embodiments, the six magnetic pillars may be disposed in a non-array arrangement, and the number of magnetic pillars may also be different.

In some embodiments, the first cover plate 10 and the second cover plate 20 both are integrated plate-like structures, and the first cover plate 10 and the second cover plate 20 are arranged in parallel, and the first magnetic pillar and the second magnetic pillar are both perpendicular to the first cover plate 10 and the second cover plate 20. The first magnetic pillar and the second magnetic pillar may be linear magnetic pillars, which are vertically sandwiched between the first cover plate 10 and the second cover plate 20, and the first magnetic pillar and the second magnetic pillar have the same height. The structure of the magnetic core is simple and easy to manufacture.

Figure 4:
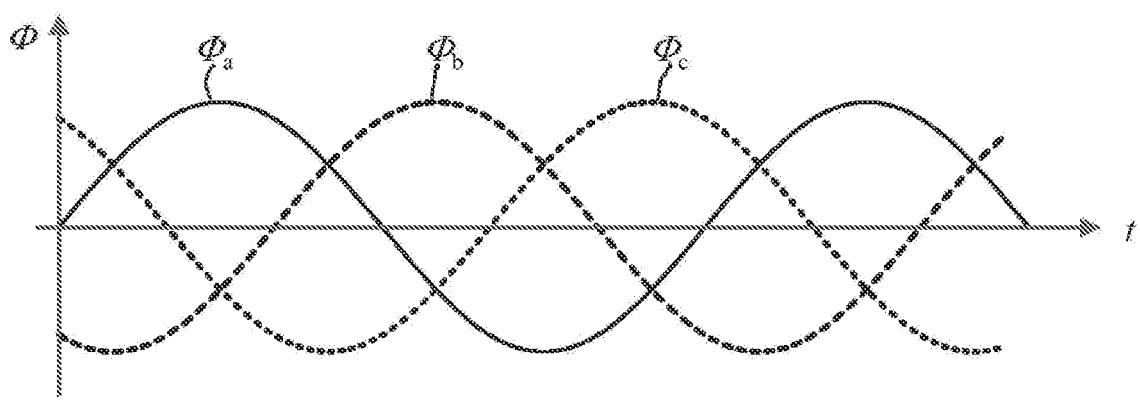
FIG. 4 is a schematic diagram showing magnetic flux of a three-phase inductor according to some embodiments.

In some embodiments, as shown in FIG. 1, a power module is provided, and the power module is a three-phase power factor correction (PFC) circuit module. The three-phase PFC circuit module may include the three-phase inductor in FIG. 3. For example, the first winding 41, the second winding 42 and the third winding 43 in the three-phase inductor in FIG. 3 are respectively used to form a first inductor $L_A$, a second inductor $L_B$ and a third inductor $L_C$ of the three-phase PFC circuit module. In some embodiments, the first current $I_a$ flows through the first inductor $L_A$, the second current $I_b$ flows through the second inductor $L_B$, and the third current $I_c$ flows through the third inductor $L_C$. The phase differences of the power-frequency current component of the first current $I_a$, the power-frequency current component of the second current $I_b$ and the power-frequency current component of the third current $I_c$ are 120°. Correspondingly, as shown in FIG. 4, the phase differences of the first magnetic flux $\Phi$ a generated by the power-frequency current component of the first current 1a, the second magnetic flux $\Phi$ b generated by the power-frequency current component of the second current $I_b$, and the third magnetic flux $\Phi$ c generated by the power-frequency current component of the third current $I_c$ are also 120°. The directions of the first current $I_a$, the second current $I_b$, and the third current $I_c$ can be set to be the same, that is, the first current $I_a$, the second current $I_b$, and the third current $I_c$ all surround the first magnetic pillar of the corresponding magnetic pillar unit in the same direction. For example, as shown in FIG. 3, the direction in which the first current $I_a$ surrounding the first magnetic pillar of the first magnetic pillar unit, the direction in which the second current $I_b$ surrounding the first magnetic pillar of the second magnetic pillar unit, and the direction in which the third current $I_c$ surrounding the first magnetic pillar of the third magnetic pillar unit are all the same, for example, all are along the clockwise direction. Furthermore, the first magnetic flux $\Phi$ a, the second magnetic flux $\Phi$ b and the third magnetic flux $\Phi$ c are superimposed on the first cover plate 10 and the second cover plate 20, and the superimposed magnetic flux at the first cover plate 10 and the second cover plate 20 is 0, that is, the sum of three magnetic fluxes is zero ($\Phi$ a+$\Phi$ b+$\Phi$ c=0). The first magnetic flux $\Phi$ a, the second magnetic flux $\Phi$ b, and the third magnetic flux $\Phi$ c have the effect of counteracting each other at the first cover plate 10 and the second cover plate 20, that is, the magnetic flux at the first cover plate 10 and the second cover plate in the embodiments of the present disclosure is relatively small, which can effectively reduce the core loss at the first cover plate 10 and the second cover plate 20, and can reduce the thickness of the first cover plate 10 and the second cover plate 20. In other embodiments, as long as the first magnetic flux $\Phi$ a, the second magnetic flux $\Phi$ b, and the third magnetic flux $\Phi$ c are at least partially counteract, the sum of the magnetic fluxes may not be zero.

In some embodiments, the three-phase PFC circuit module includes: a first input terminal A, a second input terminal B, and a third input terminal C, an output terminal Vo+ and Vo− (i.e., a positive output terminal Vo+ and a negative output terminal Vo−), and a first switching bridge arm, a second switching bridge arm and a third switching bridge arm, wherein the first input terminal A, the second input terminal B, and the third input terminal C are electrically connected to a three-phase alternating current (AC) power source, the output terminal Vo+ and Vo− are electrically connecting to a load R, and the first switching bridge arm, the second switching bridge arm and the third switching bridge arm are connected in parallel between the positive output terminal Vo+ and the negative output terminal Vo−. The first input terminal A is electrically connected to a neutral point D1 of the first switching bridge arm through the first inductor $L_A$, the second input terminal B is electrically connected to a neutral point D2 of the second switching bridge arm through the second inductor $L_B$, and the third input terminal C is electrically connected to a neutral point D3 of the third switching bridge arm through the third inductor $L_C$. Among them, the first input terminal A is electrically connected to a first phase AC power $V_A$ of the three-phase AC power source, the second input terminal B is electrically connected to the second phase AC power $V_B$ of the three-phase AC power source, and the third input terminal C is electrically connected to the third phase AC power $V_C$ of the three-phase AC power source. Each of the switch bridge arms may include two switch devices S connected in series, and a connection point of the two switch devices is the neutral point of the corresponding switch bridge arm. In other embodiments, the three-phase PFC circuit module may adopt other circuit topologies.

Figure 5:
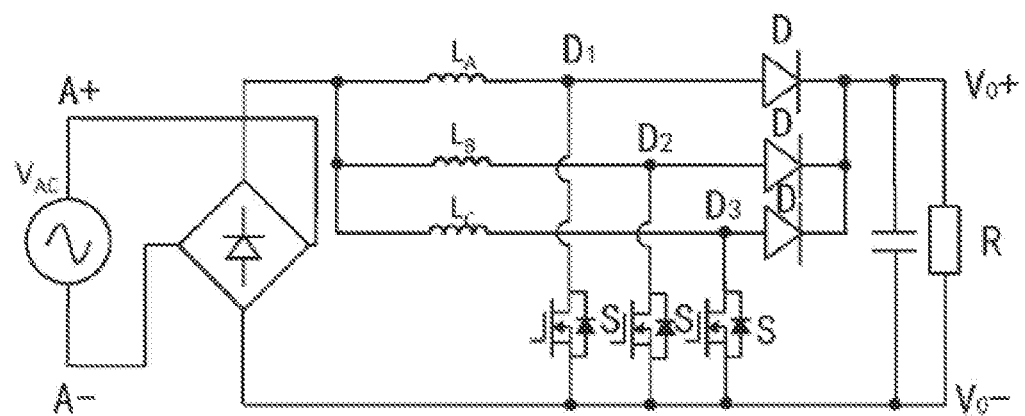
FIG. 5 is a schematic diagram of a three-way interleaved single-phase PFC circuit module according to some embodiments.

Referring to FIG. 5 to FIG. 7 and FIG. 3, in one embodiment as shown in FIG. 5, a power module is provided, and the power module is a three-way interleaved single-phase PFC circuit module. The three-way interleaved single-phase PFC circuit module may include the three-phase inductor in FIG. 3. For example, the first winding 41, the second winding 42 and the third winding 43 in the three-phase inductor are respectively used to form a first inductor $L_A$, a second inductor $L_B$ and a third inductor $L_C$ in the three-way interleaved single-phase PFC circuit module. In this embodiment, the first current $I_a$ flows through the first inductor $L_A$, the second current $I_b$ flows through the second inductor $L_B$, the third current $I_c$ flows through the third inductor $L_C$. Furthermore, the power-frequency current components of the first current $I_a$, the second current $I_b$, and the third current $I_c$ all have the same phase, while the high-frequency current components of the first current $I_a$, the second current $I_b$, and the third current $I_c$ have a phase difference of 1200 with each other. For example:

$$I_a = I_{dc} \cdot |\sin(2\pi f_0 t)| + I_{ac} \cdot Tr(2\pi f_s t)$$

$$I_b = I_{dc} \cdot |\sin(2\pi f_0 t)| + I_{ac} \cdot Tr(2\pi f_s t + 120°)$$

$$I_c = I_{dc} \cdot |\sin(2\pi f_0 t)| + I_{ac} \cdot Tr(2\pi f_s t + 240°)$$

Wherein, Tr is a triangular wave function, $f_0$ is the frequency of the power-frequency current component of the three-way current, $f_s$ is the frequency of the high-frequency current component of the three-way current, that is, the switching frequency, $I_{dc}$ is the amplitude of the power-frequency current component of the three-way current, and $I_{ac}$ is the amplitude of the high-frequency current component of the three-way current.

Figure 6:
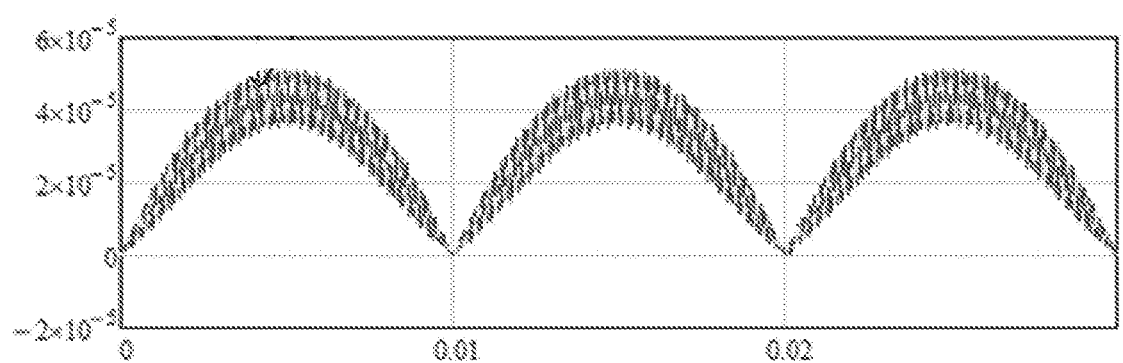
FIG. 6 is a schematic diagram showing magnetic flux of a three-phase inductor according to some embodiments.
Figure 7:
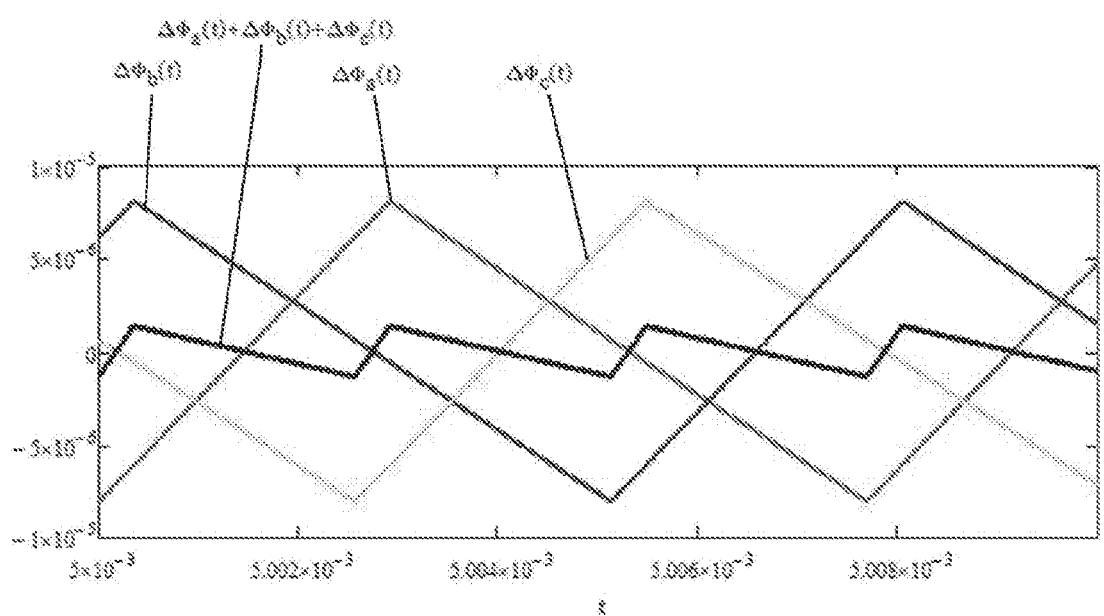
FIG. 7 is a schematic diagram of a high-frequency component of the magnetic flux of the three-phase inductor in FIG. 6.

Correspondingly, as shown in FIG. 6 and FIG. 7, the power-frequency components of the first magnetic flux Φ a generated by the first current $I_a$, the second magnetic flux Φ b generated by the second current $I_b$, and the third magnetic flux Φ c generated by the third current $I_c$ all have the same phase, while the high-frequency components of the first magnetic flux Φ a, the second magnetic flux Φ b and the third magnetic flux Φ c have a phase difference of 120° with each other. The directions of the first current $I_a$, the second current $I_b$, and the third current $I_c$ can be set to be the same. Furthermore, the first magnetic flux Φ a, the second magnetic flux Φ b, and the third magnetic flux Φ c are superimposed at the first cover plate 10 and the second cover plate 20, and the superimposed high-frequency magnetic flux components of said three magnetic flux at the first cover plate 10 and the second cover plate 20 are greatly reduced, respectively, that is, the sums (ΔΦ a+ΔΦ b+ΔΦ c) of the high-frequency component ΔΦ a of the first magnetic flux Φ a, the high-frequency component ΔΦ b of the second magnetic flux Φ b and the high-frequency component ΔΦ c of the third magnetic flux Φ c are greatly reduced, which can reduce the core loss.

In some embodiments, the three-way interleaved single-phase PFC circuit module includes: a positive input terminal A+ and a negative input terminal A− for electrically connected to a single-phase AC power source $V_{AC}$; a rectifier bridge electrically connected to the positive input terminal A+ and the negative input terminal A−; a positive output terminal Vo+ and a negative output terminal Vo− for electrically connected to a load R; and a first switch bridge arm, a second switch bridge arm and a third switch bridge arm connected in parallel between the positive output terminal Vo+ and the negative output terminal Vo−. The rectifier bridge is electrically connected to a neutral point D1 of the first switch bridge arm through the first inductor $L_A$, the rectifier bridge is electrically connected to a neutral point D2 of the second switch bridge arm through the second inductor $L_B$, and the rectifier bridge is electrically connected to a neutral point $D_3$ of the third switch bridge arm through the third inductor $L_C$. Each of the first switch bridge arm, the second switch bridge arm, and the third switch bridge arm includes a switch device S and a diode D connected in series, and a connection point of the switch device S and the diode D is the neutral point of the corresponding bridge arm. The switching frequency of the three switching devices S is the same, and the phase difference is 120°. In other embodiments, the three-way interleaved single-phase PFC circuit module may adopt other circuit topologies.

Figure 8:
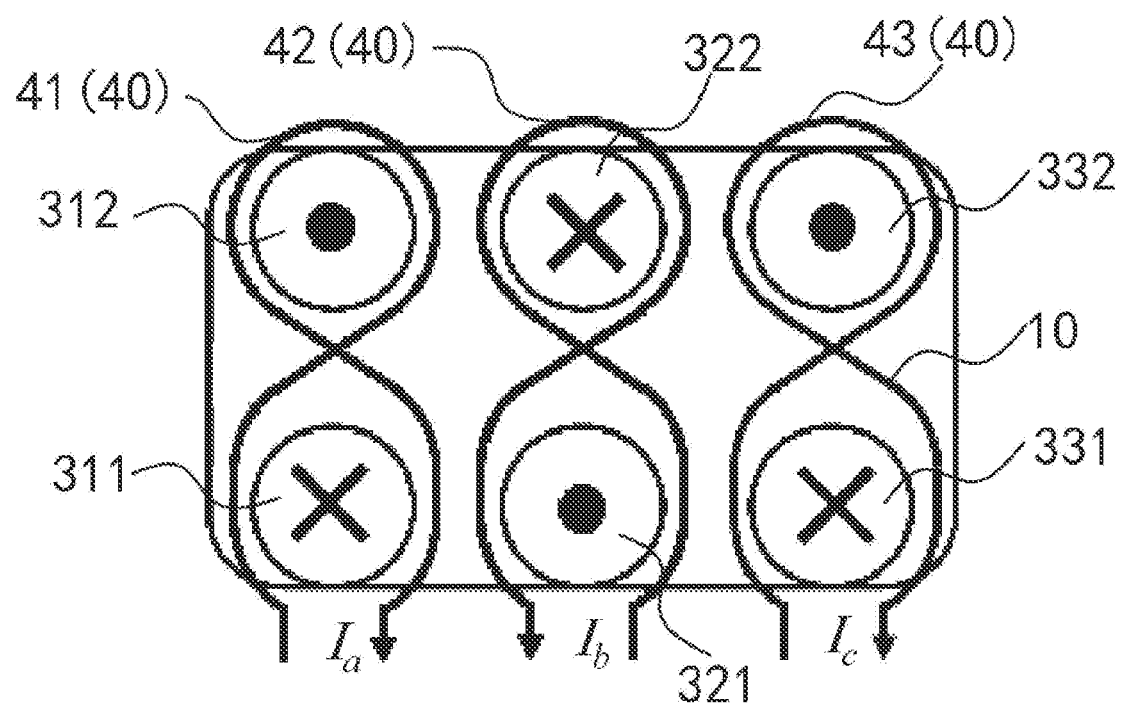
FIG. 8 is a partial structural diagram of a three-phase inductor according to some embodiments.
Figure 9:
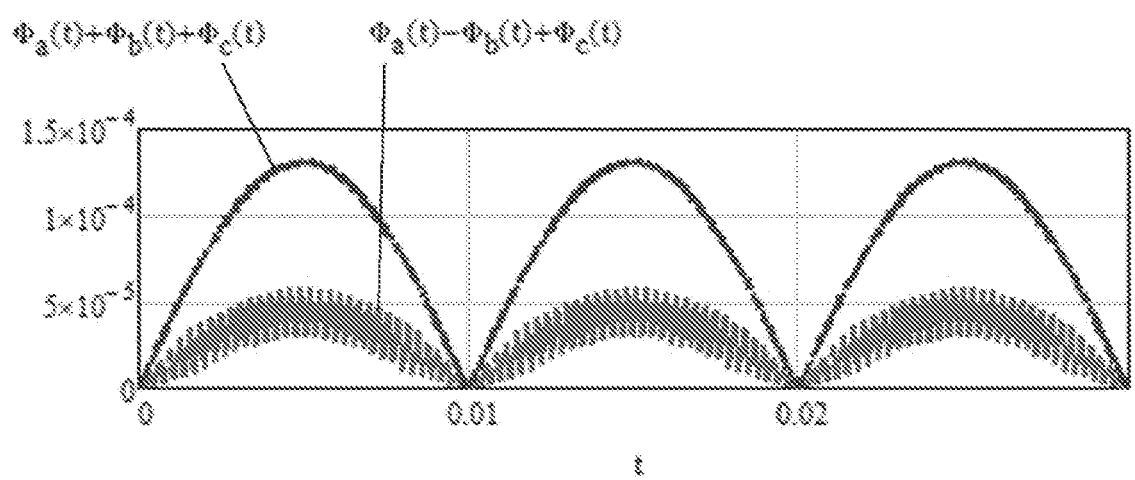
FIG. 9 is a schematic diagram of the magnetic flux of the three-phase inductor in FIG. 8.

Referring to FIG. 8 and FIG. 9, in one embodiment as shown in FIG. 8, the three-phase inductor is similar to that in FIG. 3. The main difference is that the direction of the second current $I_b$ is opposite to the directions of the first current $I_a$ and the third current $I_c$. For example, as shown in FIG. 8, the direction in which the first current $I_a$ surrounds the first magnetic pillar of the first magnetic pillar unit is the same as the direction in which the third current $I_c$ surrounds the first magnetic pillar of the third magnetic pillar unit, and the direction in which the first current $I_a$ surrounds the first magnetic pillar of the first magnetic pillar unit is opposite to the direction in which the second current $I_b$ surrounds the first magnetic pillar of the second magnetic pillar unit. For example, the first current $I_a$ surrounds the first magnetic pillar 311 in the clockwise direction, the second current $I_b$ surrounds the first magnetic pillar 321 in the counterclockwise direction, and the third current $I_c$ surrounds the first magnetic pillar 331 in the clockwise direction; and the first current $I_a$ surrounds the second magnetic pillar 312 in the counterclockwise direction, the second current $I_b$ surrounds the second magnetic pillar 322 in the clockwise direction, and the third current $I_c$ surrounds the third magnetic pillar 332 in the counterclockwise direction. The first winding 41, the second winding 42 and the third winding 43 in the three-phase inductor of this embodiment can be used to form the first inductor $L_A$, the second inductor $L_B$ and the third inductor $L_C$ in the three-way interleaved single-phase PFC circuit module. Correspondingly, as shown in FIG. 8, the direction of the second magnetic flux Φ b generated by the second current $I_b$ is opposite to the direction of the first magnetic flux Φ a generated by the first current $I_a$, and is also opposite to the direction of the third magnetic flux Φ c generated by the third current $I_c$. Furthermore, the sum of the magnetic fluxes of the first magnetic flux Φ a, the second magnetic flux Φ b, and the third magnetic flux Φ c after being superimposed at the first cover plate 10 and the second cover plate 20 is smaller, that is, Φ a-Φ b+Φ c is relatively small. The first magnetic flux Φ a, the second magnetic flux Φ b, and the third magnetic flux Φ c have the effect of counteracting each other at the first cover plate 10 and the second cover plate 20, which can reduce the core loss.

In some embodiments, the first winding 41, the second winding 42, and the third winding 43 in the three-phase inductor in FIG. 8 may be used to form the first inductor $L_A$, the second inductor $L_B$ and the third inductor $L_C$ in the three-phase PFC circuit module in FIG. 1, respectively.

According to the three-phase inductor of these embodiments, the integration degree of the three-phase inductor is improved by sandwiching three magnetic pillar units between the first cover plate and the second cover plate. Moreover, the power-frequency components of the magnetic fluxes of the three windings are superimposed on the first cover plate and the second cover plate to achieve the effect of reducing the magnetic flux density, thereby reducing the thickness of the first cover plate and the second cover plate and reducing the volume of the three-phase inductor; or the high-frequency components of the magnetic fluxes of the three windings are superimposed on the first cover and the second cover respectively to achieve the effect of reducing the high-frequency magnetic flux density, thereby reducing the loss of the first cover plate and the second cover plate and further reducing the loss of the three-phase inductor.

Those skilled in the art will easily think of other embodiments of the present invention after considering the description and practicing the disclosure disclosed herein. The present disclosure is intended to cover any variations, uses, or adaptive changes of the present invention. These variations, uses, or adaptive changes follow the general principles of the present disclosure and include common knowledge or conventional technical means in the technical field not disclosed by the present disclosure. The description and example embodiments are to be regarded as exemplary only, and the true scope of the present disclosure is pointed out by the claims.

It should be understood that the present disclosure is not limited to the precise structure described above and shown in the drawings, and various modifications and changes can be made without departing from its scope. The scope of the present disclosure is only limited by the appended claims.

What is claimed is:

1. A three-phase inductor, wherein a current flowing through each inductor of the three-phase inductor comprising a power-frequency current component and a high-frequency current component, and the three-phase inductor comprising:
    a magnetic core comprising a first cover plate, a second cover plate and three magnetic pillar units, the first cover plate and the second cover plate disposed opposite to each other, the three magnetic pillar units being sandwiched between the first cover plate and the second cover plate, and the three magnetic pillar units comprising a first magnetic pillar unit, a second magnetic pillar unit, and a third magnetic pillar unit, the first magnetic pillar unit comprising a first magnetic pillar and a second magnetic pillar, the second magnetic pillar unit comprising a third magnetic pillar and a fourth magnetic pillar, the third magnetic pillar unit comprising a fifth magnetic pillar and a sixth magnetic pillar, and two ends of each of the first to sixth magnetic pillars being respectively connected to the first cover plate and the second cover plate; and
    at least one winding comprising a first winding, a second winding, and a third winding;
        the first winding being wound on the first magnetic pillar and the second magnetic pillar of the first magnetic pillar unit, and a first current flowing through the first winding surrounds the first magnetic pillar in a direction opposite to a direction in which the first current flowing through the first winding surrounds the second magnetic pillar of the first magnetic pillar unit;
        the second winding being wound on the third magnetic pillar and the fourth magnetic pillar of the second magnetic pillar unit, and a second current flowing through the second winding surrounds the third magnetic pillar in a direction opposite to a direction in which the second current flowing through the second winding surrounds the fourth magnetic pillar of the second magnetic pillar unit;
        the third winding being wound on the fifth magnetic pillar and the sixth magnetic pillar of the third magnetic pillar unit, and a third current flowing through the third winding surrounds the fifth magnetic pillar in a direction opposite to a direction in which the third current flowing through the third winding surrounds the sixth magnetic pillar of the third magnetic pillar unit,
    wherein,
    the first current generates a first magnetic flux, and the first magnetic flux is flowed in a first closed magnetic circuit formed by the first magnetic pillar, the first cover plate, the second magnetic pillar, and the second cover plate,
    the second current generates a second magnetic flux, and the second magnetic flux is flowed in a second closed magnetic circuit formed by the third magnetic pillar, the first cover plate, the fourth magnetic pillar, and the second cover plate, and
    the third current generates a third magnetic flux, and the third magnetic flux is flowed in a third closed magnetic circuit formed by the fifth magnetic pillar, the first cover plate, the sixth magnetic pillar, and the second cover plate.

2. The three-phase inductor according to claim 1, wherein the first magnetic pillar unit, the second magnetic pillar unit, and the third magnetic pillar unit are sequentially spaced apart with each other along a first direction, the first magnetic pillar and the second magnetic pillar of the first magnetic pillar unit are disposed at an interval along a second direction, the third magnetic pillar and the fourth magnetic pillar of the second magnetic pillar unit are disposed at an interval along the second direction, the fifth magnetic pillar and the sixth magnetic pillar of the third magnetic pillar unit are disposed at an interval along the second direction, and an angle between the first direction and the second direction is between 60° and 120°.

3. The three-phase inductor according to claim 1, wherein the first cover plate and the second cover plate are both integrated plate-shaped structures, and the first cover plate and the second cover plate are arranged in parallel, and each of the first magnetic pillar to the sixth magnetic pillar is perpendicular to the first cover plate and the second cover plate.

4. The three-phase inductor according to claim 1, wherein the power-frequency current component of the first current, the power-frequency current component of the second current, and the power-frequency current component of the third current have a phase difference of 120°, respectively.

5. The three-phase inductor according to claim 4, wherein a direction in which the first current surrounds the first magnetic pillar of the first magnetic pillar unit is the same as a direction in which the third current surrounds the fifth magnetic pillar of the third magnetic pillar unit, and the direction in which the first current surrounds the first magnetic pillar of the first magnetic pillar unit is the same as or opposite to a direction in which the second current surrounds the third magnetic pillar of the second magnetic pillar unit.

6. The three-phase inductor according to claim 1, wherein, the power-frequency current component of the first current, the power-frequency current component of the second current, and the power-frequency current component of the third current have a same phase, and the high-frequency current component of the first current, the high-frequency current component of the second current and the high-frequency current component of the third current have a phase difference of 120°, respectively.

7. The three-phase inductor according to claim 6, wherein a direction in which the first current surrounds the first magnetic pillar of the first magnetic pillar unit is the same as a direction in which the third current surrounds the fifth magnetic pillar of the third magnetic pillar unit, and the direction in which the first current surrounds the first magnetic pillar of the first magnetic pillar unit is the same as or opposite to a direction in which the second current surrounds the third magnetic pillar of the second magnetic pillar unit.

8. The three-phase inductor according to claim 1, wherein a frequency of the power-frequency current component is within 120 Hz, and a frequency of the high-frequency current component is at least 20 kHz.

* * * * *